US010032286B2

United States Patent
Feldman et al.

(10) Patent No.: US 10,032,286 B2
(45) Date of Patent: Jul. 24, 2018

(54) TRACKING OBJECTS BETWEEN IMAGES

(71) Applicant: A9.com, Inc., Palo Alto, CA (US)

(72) Inventors: Bryan E. Feldman, San Francisco, CA (US); Nalin Pradeep Senthamil, Santa Clara, CA (US); Arnab Sanat Kumar Dhua, Mountain View, CA (US); Gurumurthy D. Ramkumar, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 15/787,545

(22) Filed: Oct. 18, 2017

(65) Prior Publication Data

US 2018/0040134 A1 Feb. 8, 2018

Related U.S. Application Data

(63) Continuation of application No. 15/606,247, filed on May 26, 2017, now Pat. No. 9,824,459, which is a continuation of application No. 14/076,053, filed on Nov. 8, 2013, now Pat. No. 9,691,158, which is a continuation of application No. 13/113,989, filed on May 23, 2011, now Pat. No. 8,582,821.

(51) Int. Cl.
*G06T 7/246* (2017.01)
*G06T 7/254* (2017.01)

(52) U.S. Cl.
CPC ............ *G06T 7/248* (2017.01); *G06T 7/254* (2017.01); *G06T 2207/10016* (2013.01)

(58) Field of Classification Search
CPC combination set(s) only.
See application file for complete search history.

(56) References Cited

U.S. PATENT DOCUMENTS

| 5,109,425 A | | 4/1992 | Lawton |
| 5,311,305 A | * | 5/1994 | Mahadevan .......... G01S 3/7864 348/169 |
| 5,414,474 A | | 5/1995 | Kamada et al. |
| 5,488,675 A | * | 1/1996 | Hanna .................... H04N 5/272 348/589 |
| 5,500,904 A | * | 3/1996 | Markandey ............. G06T 7/269 382/103 |

(Continued)

OTHER PUBLICATIONS

USPTO Non-Final Office Action dated Mar. 29, 2013 for U.S. Appl. No. 13/113,989, filed May 23, 2011, 5 pages.

(Continued)

*Primary Examiner* — Anand Bhatnagar
(74) *Attorney, Agent, or Firm* — Hogan Lovells US LLP

(57) ABSTRACT

Systems and methods track one or more points between images. A point for tracking may be selected, at least in part, on a determination of how discriminable the point is relative to other points in a region containing the point. A point of an image being tracked may be located in another image by matching a patch containing the point with another patch of the other image. A search for a matching patch may be focused in a region that is determined based at least in part on an estimate of movement of the point between images. Points may be tracked across multiple images. If an ability to track one or more points is lost, information about the points being tracked may be used to relocate the points in another image.

20 Claims, 12 Drawing Sheets

(56) References Cited

U.S. PATENT DOCUMENTS

| | | | |
|---|---|---|---|
| 5,625,702 A * | 4/1997 | Kamada | G06K 9/00335 382/107 |
| 5,626,702 A | 5/1997 | Sharpe et al. | |
| 5,732,146 A * | 3/1998 | Yamada | G06K 9/00711 348/14.15 |
| 6,072,903 A | 6/2000 | Maki et al. | |
| 6,263,088 B1 * | 7/2001 | Crabtree | G01S 3/7865 348/169 |
| 6,337,917 B1 | 1/2002 | Onural et al. | |
| 6,380,986 B1 | 4/2002 | Minami et al. | |
| 6,597,816 B1 * | 7/2003 | Altunbasak | G06T 5/006 348/241 |
| 6,606,406 B1 * | 8/2003 | Zhang | G06K 9/00201 345/422 |
| 7,046,850 B2 * | 5/2006 | Braspenning | G06T 7/00 382/209 |
| 7,106,899 B2 * | 9/2006 | Zhang | G06K 9/00201 345/422 |
| 7,136,506 B2 * | 11/2006 | Howard | G06K 9/0063 382/103 |
| 7,194,110 B2 * | 3/2007 | Qian | G06T 7/246 348/169 |
| 7,400,344 B2 * | 7/2008 | Ito | G01S 3/7864 348/169 |
| 7,961,982 B2 * | 6/2011 | Sibiryakov | G06K 9/6211 382/107 |
| 2002/0064310 A1 * | 5/2002 | Braspenning | G06T 7/00 382/209 |
| 2004/0125984 A1 * | 7/2004 | Ito | G01S 3/7864 382/103 |
| 2004/0170322 A1 * | 9/2004 | Wilinski | H04N 19/543 382/190 |
| 2012/0213405 A1 * | 8/2012 | Sasaki | G06K 9/00791 382/103 |

OTHER PUBLICATIONS

USPTO Notice of Allowance dated Jul. 25, 2013 for U.S. Appl. No. 13/113,989, filed May 23, 2011, 9 pages.

USPTO Non-Final Office Action dated Sep. 2, 2016 for U.S. Appl. No. 14/076,053, filed Nov. 8, 2013, 6 pages.

USPTO Notice of Allowance dated Mar. 1, 2017 for U.S. Appl. No. 14/076,053, filed Nov. 8, 2013, 9 pages.

USPTO Notice of Allowance dated Jul. 21, 2017 for U.S. Appl. No. 15/606,247, filed May 26, 2017, 9 pages.

* cited by examiner

TRACKING OBJECTS BETWEEN IMAGES

CROSS-REFERENCES TO RELATED APPLICATIONS

This application is a continuation of allowed U.S. application Ser. No. 15/606,247, filed May 26, 2017, which is a continuation of U.S. application Ser. No. 14/076,053, filed Nov. 8, 2013 (now U.S. Pat. No. 9,691,158), which is a continuation of U.S. application Ser. No. 13/113,989, filed on May 23, 2011 (now U.S. Pat. No. 8,582,821), all of which are entitled "Tracking Objects Between Images", all of which incorporates by reference for all purposes the full disclosure of U.S. application Ser. No. 12/319,992 entitled "System and Method for Representing Image Patches" filed on Jan. 14, 2009.

BACKGROUND

Tracking objects in video is useful for a variety of reasons. For instance, keeping track of an object's location allows the enhancement of video in connection with the object. Text, graphics, or other information may be added to video to enhance the experience of those viewing the video. Similarly, hyperlinks or other information may be added to video in connection with objects in the video to allow users to take action in connection with the objects, such as navigating to an information resource related to the object. By tracking the objects in the video, the information with which the video is enhanced may be optimally placed.

Many devices have the ability to capture video, whether by recording and storing video data for future use and/or by displaying, on a display device, video that is currently being captured. Such devices include not only traditional video capturing devices, but also other devices, such as mobile communication devices, whose primary purpose is not necessarily the capture of video. At the same time, video can involve relatively large amounts of data and, therefore, processing video can be resource intensive, often pushing the resources' limits. Moreover, in many instances, it is desirable to track objects in video simultaneously or nearly simultaneously with its capture. Accordingly, efficient tracking of objects in video may be advantageous in many circumstances, especially when resources for processing video are limited.

DETAILED DESCRIPTION

Figure 2:
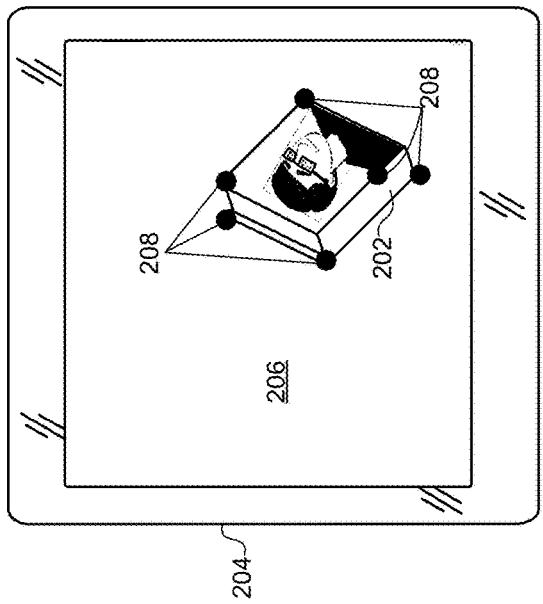
FIG. 2 illustrates the device of FIG. 1 capturing an image, but the device being oriented differently than in FIG. 1.

Techniques described and suggested herein include systems and methods for tracking points between images. The images may be, for example, sequential images taken of one or more subjects. In at least some embodiments, the images are frames from a video in which the subjects appear. The video may be captured by a portable device, such as a mobile device with video capture capabilities. Any device used in connection with the various embodiments described herein may be configured to store, at least temporarily, image data representative of the images being captured. The image data may represent an array of pixels and may include information regarding the state of each pixel. The image data may, for instance, indicate a color for each pixel. In an embodiment, the image data corresponds to grayscale images such that the image data indicates an intensity value for each pixel. The device may process the image data in accordance with the various embodiments described herein. The device may also utilize image data of different qualities simultaneously. For instance, the device may display color images of a video during the video's capture and/or playback. However, for the various techniques described herein, the device may process grayscale image data that may be at a different resolution than the color image data.

In one embodiment, one or more points of an image are selected for tracking. In an embodiment, a feature detector is used to obtain an initial set of candidate track points. The feature detector may be, for example, a corner detector. Application of the feature detector to the image may include calculation of a feature detector score for each of a plurality of points of the image. The feature detector score for a point, in an embodiment, measures how discriminable a point is from points in a region surrounding the point. The region may be on the order of a few pixels. The confidence with which a point with a low feature detector score may be correctly located in another image may be low. For example, it may be difficult to locate a particular corner in a region that includes several points that resemble corners.

In an embodiment, the candidate points are rescored according to how discriminable the points are in a larger region. Rescoring the candidate points, in an embodiment, uses a patch matching procedure. The patch matching procedure, as used for a point, may compare a patch surrounding the point with patches of a search window surrounding the point. The patches and search window may be regions, which may be rectangular, and the size of the search window may be larger than each of the patches. The comparison of the patch surrounding the candidate point and other patches in the search window may include calculating a score for each pair of patches (a patch matching score) that indicates how closely each patch of the pair resemble each other. Higher patch patching scores pairs of patches may correspond to greater similarity between the patches of the pairs, although the scores may be configured in other ways. In an embodiment where a higher patch matching score indicates greater similarity between patches, a candidate point may be given a search-scale score, which may be or be based at least in part on the inverse of the highest patch matching score measured between a patch surrounding the candidate point and other patches in the search window. In this manner, the candidate point is rescored according to how discriminable the point is from other points in the search window.

In an embodiment, when all the candidate points have been rescored with search-scale scores, a set of active track points may be selected from the set of candidate points. The set of active track points may be selected in a manner that is more likely to result in the selected active track points being spatially distributed about the image than if the search-scale scores were used by themselves to select the points. In an embodiment, the image comprises a plurality of bins, where a bin may be a region, which may be rectangular of the image. The bins may be, for example, a set of rectangular regions of uniform size that collectively comprise the image. In an embodiment, points are selected from a spatially distributed set of bins that each contain at least one candidate point. If a bin has multiple candidate points, one or more points having the highest corresponding search scale scores may be selected. For instance, for each of a plurality of bins that have candidate points, the candidate point having the highest search-scale score may be selected as an active track point. In an embodiment, points are selected from bins having candidate points in a random order or other order that is more likely to result in a spatially distributed set of candidate points.

In an embodiment, active track points are identified in one or more other images. The other images may be subsequent frames of a video. The active track points may be points that were selected in accordance with the above procedure, or points that were selected in another manner. Tracking a point from one image to another, in an embodiment, includes searching the other image for a patch that resembles a patch surrounding the point. To avoid searching the whole other image, the search may be confined to a search window of the other image. The search window may be centered in the other image at the same location of the point for which a matching patch is sought.

In an embodiment, the location of the search window is updated to account for movement of the point being tracked between frames. For instance, a portable capture device and a subject of a video capture may have moved relative to one another between frames of the video and a location of the search window may be updated accordingly. Further, for tracked points of an image that correspond to real-world points that are approximately the same distance from the capture device, movement of the capture device may cause the tracked points to translate approximately the same distance and direction between frames. Accordingly, in an embodiment, updating the location of the search window includes estimating a global translation, which may be a translation of a plurality of tracked points. The global translation may be a vector or other information that describes a direction of translations and whose magnitude indicates a distance of translation in the described direction.

In an embodiment, estimating the global translation includes template matching between regions of a first image and a second image, such as a prior frame and a current frame of a video. In an embodiment, template matching between the regions includes comparing a downsampled patch from the first image with downsampled patches of the second image to find a matching patch of the second image. The downsampled patch may be a patch of the first image that surrounds a point being tracked, or, generally, may be any patch. The downsampled patches of the second image may be from a region of the second image which may be smaller than or the same size as the second image. Using low-resolution (downsampled) images may achieve both computational efficiency and a robustness to blur, which may occur when there is a large image translation that may be important to detect and measure. More than one patch from the first image may be matched with a corresponding patch in the second image. Once one or more matches between the first and second image are identified, the differences in locations of a patch in the first image and a matching patch in the second image may be used to obtain the global translation. If multiple matches are made, the multiple matches may be used to estimate the global translation. For instance, multiple matches may be used to identify and possibly disregard matches for which the patch from the first image and the matched patch from the second image did not translate relative to one another relative to other matches.

In an embodiment, when a global translation has been estimated, the global translation may be used to track points between the first image and the second image. For instance, a point from the first image may be located in the second image by matching a patch surrounding the point with patches in the second image. To efficiently search the second image for a matching patch, the search may be confined to a search window. The search window may be located (e.g. centered) at a location that is based at least in part on a translation of the location of the point being sought by the global translation estimate. For example, if the Cartesian coordinates of the point being sought in the first image is (a,b) and the global translation estimate is (x,y) (indicating a translation of x pixels along one axis and y pixels along another axis), the search window may be centered at location (a+x, b+y) in the second image. In this manner, a search for matching patches may proceed in a region that is more likely to contain the point being sought.

In an embodiment, a capture device includes one or more sensors that provide information on capture device motion. The capture device may include, for example, a gyroscope and/or accelerometer which may provide information regarding rotation and translation of the capture device. In an embodiment, information provided by one or more sensors is used to calculate the global translation. The information provided by one or more sensors may be used instead of or in addition to estimation of global translation estimated using patch matching, discussed above. For instance, information provided by one or more sensors may be used to confirm a global translation estimation by checking whether the sensor data is consistent with the global translation estimate. As another example, sensor data may be used to efficiently search for matching patches in the procedure described above by allowing for an estimate of where a search for a matching patch is likely to be found. For example, sensor data indicating rotation and/or translation in one manner may indicate that a matching patch is likely to be found in one corner of an image whereas sensor data indicating rotation and/or translation in another manner may indicate that a matching patch is likely to be found in another corner of the image. As yet another example, sensor data may be used to determine the size of the search window in which patches are checked for matches. If the sensor data indicates a relatively small rotation and/or translation, the search window may be smaller than if the sensor data indicates a relatively large rotation and/or translation. In this manner, the size of the search window and, therefore, the number of patches that need to be compared, is reduced in instances when there was little movement of the device and, therefore, when it is less likely that there is a large global translation. Similarly, sensor data may be used to determine whether to estimate a global translation at all. For example, if the sensor data indicates little or no movement of a capture device, a global translation may not be calculated and a search window may be located based on the location of the point being tracked. For instance, the search window may be centered at the location of the point being tracked. Generally, the sensor data may be used in any suitable manner in connection with global translation estimation.

In an embodiment, patch matching procedures, such as those discussed above, are made more efficient through the use of one or more feature detectors. As above, the feature detectors may be corner detectors. In some embodiments, patch matching is performed by exhaustively searching every location within a search window. However, if large search windows are used, exhaustive searching may result in many unnecessary patch comparisons. Accordingly, one or more feature detectors may be used to reduce the number of comparisons that are made. As discussed, a track point may correspond to a point that has some feature as determined by a feature detector. The track point may exhibit properties of a corner, for example. In an embodiment, a feature detector is applied to a search window to identify candidate points. A patch surrounding the track point may be compared with patches surrounding the candidate points to identify a match. In this manner, patches are compared with other patches that are more likely to result in a match.

In some instances, the ability to track points may be inhibited for various reasons. For example, if another object occludes the tracked object, points corresponding to the tracked object may not appear in one or more frames of a video and there may be no information available for tracking. As another example, a user may rapidly move a capture device, causing points being tracked to translate and/or rotate large distances within a video. Capture devices with limited processing capabilities may yield extremely blurred images where most, if not, all of the objects salient features are lost, or at least, become significantly more difficult to detect.

In an embodiment, one or more tracking points are relocated upon a detection of an inability to track the one or more tracking point. In an embodiment, track is recovered by re-detecting the lost object using a high-level object recognition technique. In an embodiment, patches of an image are encoded with an invariant feature descriptor, that is, using an algorithm that provides information about a point that is substantially invariant to various ways an object in the image is able to move. A feature descriptor may be, for example, calculated for patches surrounding a set of tracking points in the image. The calculated feature descriptors may be stored in a data store, which may be memory of a capture device. Feature descriptors may also be calculated for non-tracked points, such as for the purpose of re-detection robustness.

In an embodiment, feature descriptors are calculated for patches in another image (such as a subsequent frame of a video) and compared to the feature descriptors that have been stored in the data store. The patches of the other image may be patches surrounding points identified as candidate points using a feature descriptor. In an embodiment, if sufficiently many feature descriptors match between an object in the database and the new image, then a correspondence between track points and points of the other image may be identified according to the matching feature descriptors. In this manner, points are tracked across a failure to track the points using other techniques.

Figure 1:
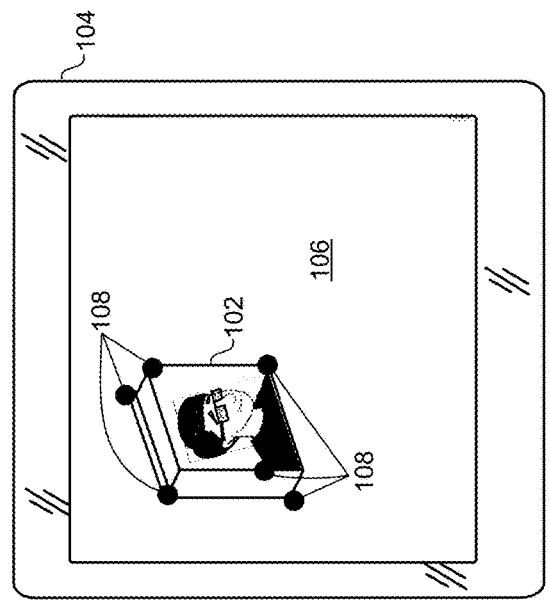
FIG. 1 illustrates a device capturing an image in accordance with at least one embodiment.

As discussed, various devices may be used to capture video and one or more objects may appear in the captured video. FIG. 1 illustrates an example of a device capturing video of an object and how movement of the device and object relative to one another may change the images that make up the video. FIG. 1 also illustrates how points of a video may be tracked. In this particular example, a mobile device 100 is illustrated as capturing a video that includes a book 102. The mobile device 100, in an embodiment, is a mobile device having video-capture capabilities, although any device having such capabilities may be used in accordance with various embodiments. Such devices include, but are not limited to, video recorders, laptop or desktop computers with built-in or accessory video cameras, tablet computing devices with video capturing ability, and the like. Embodiments of the present disclosure may involve any device that is able to capture sequences of image data sets, which may be referred to as frames.

Also shown in FIG. 1 is display device 104 of the mobile device 100. The display device in this example shows an image of the object which is the subject of the video being captured, in this case, a book 102. Thus, an image 106 of the book appears in a screen area of the display device 104. The mobile device 100 may store video as it is captured for retrieval at a later date. However, the mobile device 100 may also simply display the video as it is being captured and any storage of video data may be ephemeral.

FIG. 1 also illustrates various points 108 of the image 106 being tracked by the mobile device 100. In an embodiment, the points being tracked include points identified as corners. However, any point that is distinguishable from other points in the image 106 may be tracked. As the mobile device 100 captures video of the book 102, the mobile device 100 and the book 102 may move relative to each other, thus the mobile device 100 may move and/or the book 102 may move. As shown in FIG. 2, a mobile device 200, which may be the mobile device 100 of FIG. 1, is illustrated as having been rotated relative to a book 202, which may be the book 102 described above in connection with FIG. 1. Due to the rotation of the mobile device 200, a display device 204 of the mobile device 200 shows an image 206 of the book 202 oriented differently than in FIG. 1. Points 208 being tracked are also shown as oriented differently than corresponding points 108 as described in FIG. 1.

Figure 3:
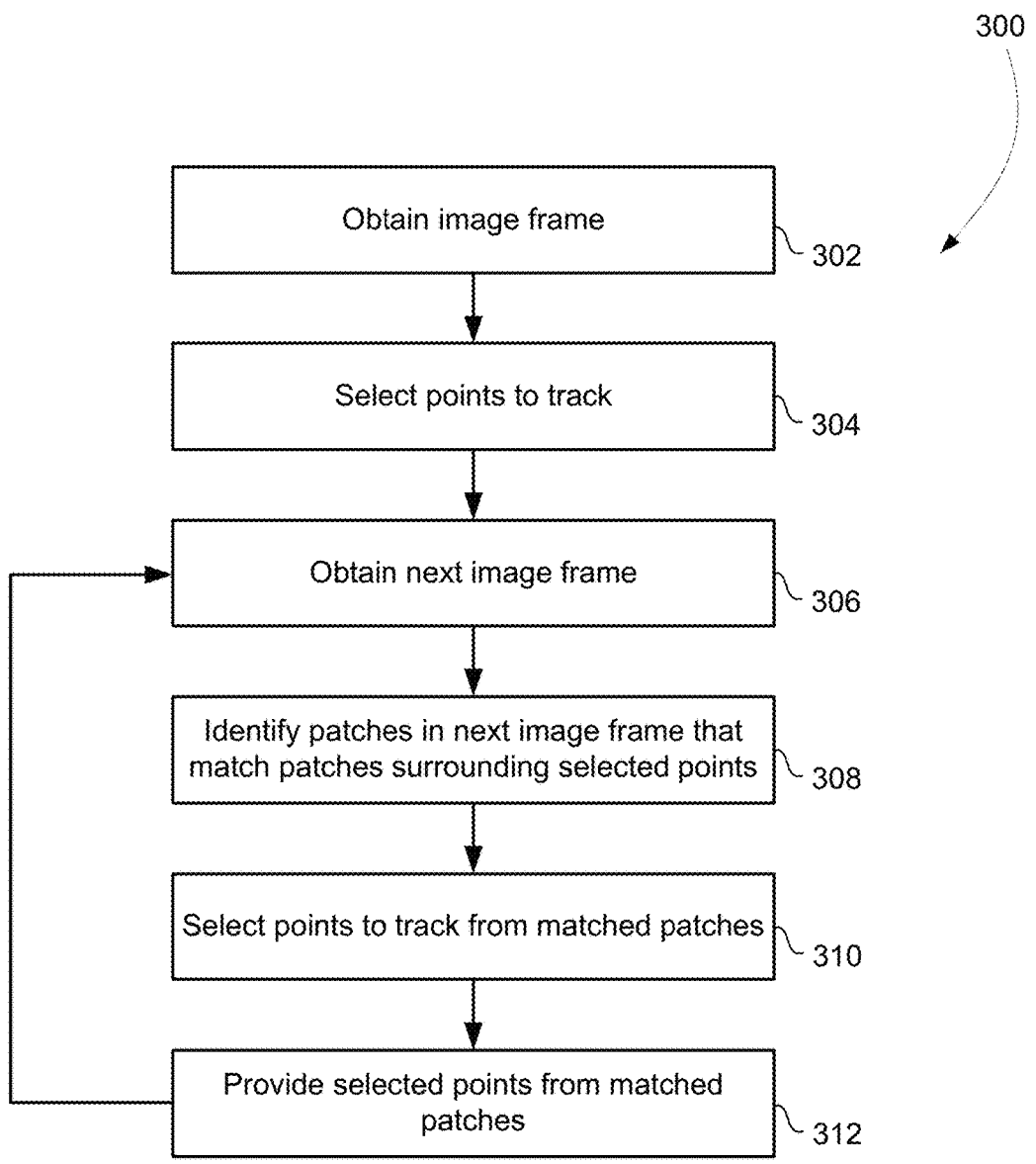
FIG. 3 illustrates example steps of a process for tracking points in a video in accordance with an embodiment.

FIG. 3 provides an illustrative example of a process 300 that may be used to track points in accordance with an embodiment. Some or all of the process 300 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In an embodiment, the process 300 includes obtaining 302 an image frame. Obtaining an image frame may be done in any suitable manner. For example, generally, an image capturing device converts light reflected from one or more objects into an electronic representation of the one or more objects. The electronic representation, i.e. the image frame, may be information representing an array of pixels that collectively represent the image is being captured. The video may comprise multiple sequential image frames. In other words, the image frame may represent a state of the video at a moment of time. In an embodiment, the image frame comprises image data that is black and white, although the image frame may include data representative of colors of the object's whose image is being captured.

In an embodiment, points to track of the obtained image are selected 304. Selection of the points to track may be done in any suitable manner, including using techniques described below. In an embodiment, points are selected because of one or more characteristics of the points. The points, for example, may exhibit characteristics that allow for identification of the points in subsequent frames. As described in more detail below, points may be selected because the selected points exhibit one or more features indicating that the points each correspond to a corner. In an embodiment, a next image frame is obtained 306. For example, as a video capture device captures video of one or more objects, frames may be calculated by the device accordingly. In an embodiment, patches in the next image frame that match patches surrounding the selected points are identified 308. Generally, as will be described in more detail below, one more procedures may be used to identify patches in the next image frame that match patches of a previous image frame. Once the patches of the next image frame are matched with patches of the previous image frame, points from the matched patches are selected 310 and provided 312. For example, in a device performing the process 300, the selected points from the next image frame may be identified as currently tracked points (tracking points) that may be subsequently matched with points of a subsequent frame. Accordingly, as shown in FIG. 3, the process 300 may repeat one or more actions, such as matching the tracking points with points in another subsequently obtained frame. In this manner, the tracking points are updated throughout the frames.

Various of the process 300, and of any process described herein, are considered as being within the scope of the present disclosure. For instance, as illustrated in FIG. 3, the process 300 tracks points from one frame to a next frame. The next frame may be the next frame sequentially. Frames, however, may be skipped and tracking points may be matched with points in a subsequent frame that is not necessarily the sequentially next frame in the video being captured. In addition, while FIG. 3 illustrates many aspects of an image in the plural, such as "patches," embodiments of the present disclosure may apply to the same objects in the singular. For instance, a single point may be tracked and, to do so, a single patch may be identified in a subsequent frame. Of course, the above are illustrative examples of variations and other variations are also considered as being within the scope of the present disclosure.

Figure 4:
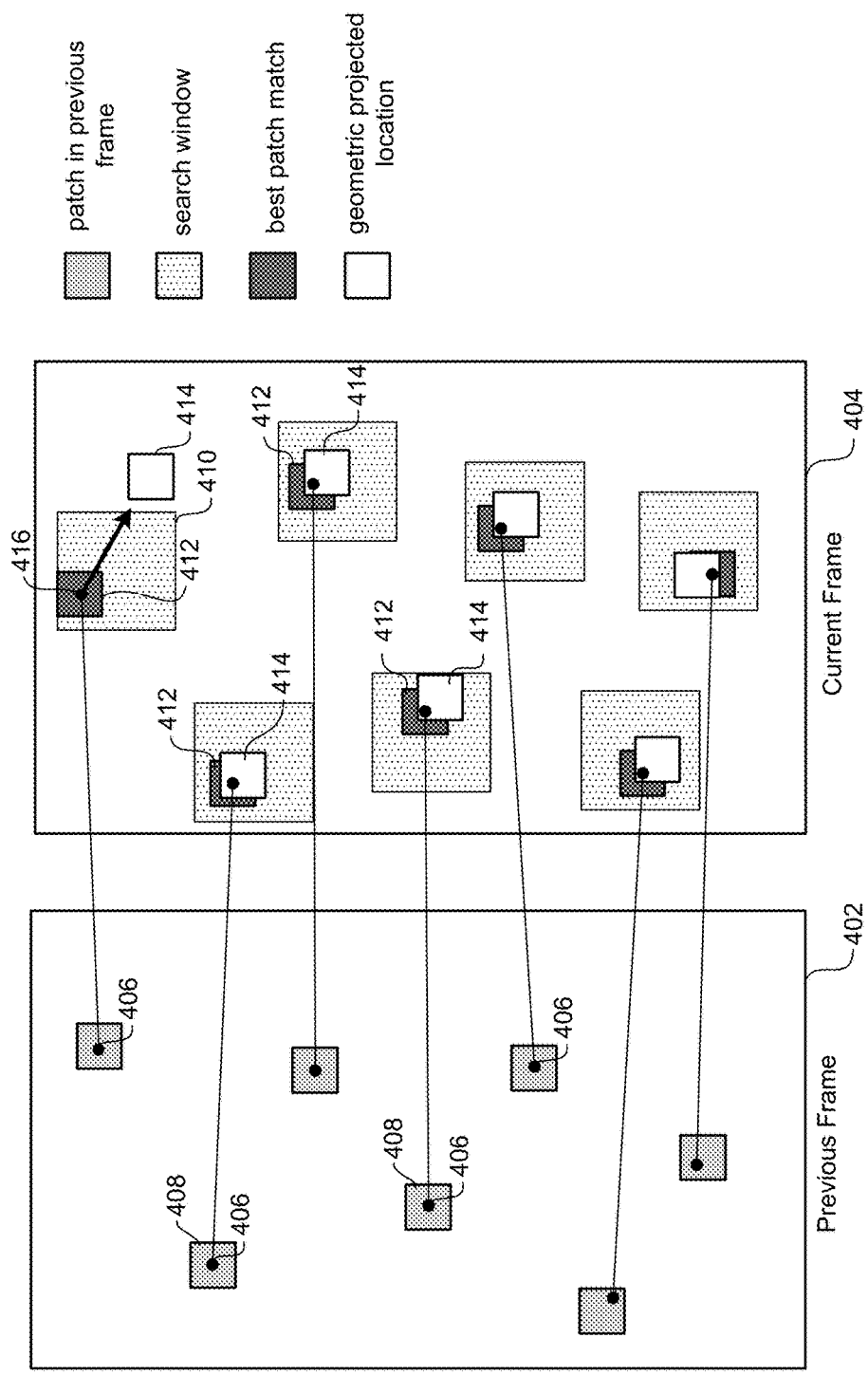
FIG. 4 illustrates a representation of a process for tracking points in a video in accordance with at least one embodiment.

FIG. 4 is a diagram illustrating how points may be tracked between frames. In particular, FIG. 4 illustrates a previous frame 402 and a current frame 404. In an embodiment, the current frame and the previous frame are sequential frames of a video being captured, although, as noted, in some embodiments, other frames may have been captured between the previous frame 402 and the current frame 404. As illustrated, the previous frame includes a plurality of points 406 being tracked. In an embodiment, patches 408 surrounding the points 406 are matched with patches in the current frame 404. A patch may be a set of image points surrounding a point being tracked. In an embodiment, a patch for a point being tracked is a rectangular region having a center located at the point being tracked. However, the patch may be another geometric shape and the point being tracked may not correspond to the center (if any) of the shape.

Matching a patch from the previous frame 402 to the current frame 404 may be accomplished in various ways. In an embodiment, patch matching is performed by comparing the patches 408 of the previous frame with other patches of the current frame inside of a search window 410. Two patches may be compared using various techniques for measuring the similarity between patches. Suitable measurements that may be used in comparing patches may include pixel-based distances, correlation and normalized correlation between patches, descriptor-based distances such as a SIFT descriptor distance, and probabilistic matching measures. Generally, when using measurements of patch similarity, pairs of patches being compared may be scored according to a measurement of their similarity. The scores may be used to select a pair of patches that, according to the measure being used, indicates the highest similarity between the patches. For instance, if higher measurements of similarity between patches indicate closer similarity for some measuring technique being utilized, the pair with the highest score may be selected as a pair of matching patches. Likewise, if lower measurements of similarity between patches indicate closer similarity for some measuring technique being utilized, the pair with the highest score may be selected as a pair of matching patches.

A search window may be a region of the current frame that includes one or more patches that are checked against the patch of the tracking point in a previous frame. The search window may be a rectangular (or other shape) region surrounding a point in the current frame. The search window for a tracking point may encompass (and may be centered at) the same location as the point being tracked or may be otherwise located. For instance, the search window may be determined based at least in part on a projected location of the point being tracked in the current frame.

As illustrated in FIG. 4, patches of the search window may be compared with corresponding patches of the previous frame until a best patch match 412 is identified. A projected geometric location of the patch, as described in more detail below, may be used in order to identify where to start searching in the search window 410. Also, as illustrated by the upper-most best matched patch 412 of the current frame of FIG. 4, the projected geometric location 414 of the best matched patch 412 may not always be in the search window. In an embodiment, once a best matched patch 412 is identified, a point from the best matched patch, which may be a center point, may be identified as the current point 416 being tracked. Points identified from the current frame may subsequently then be used to locate points in yet another subsequent frame. Thus, the best patch matches 412 of the current frame may be used as a basis for locating matching patches in a subsequent frame.

Figure 5:
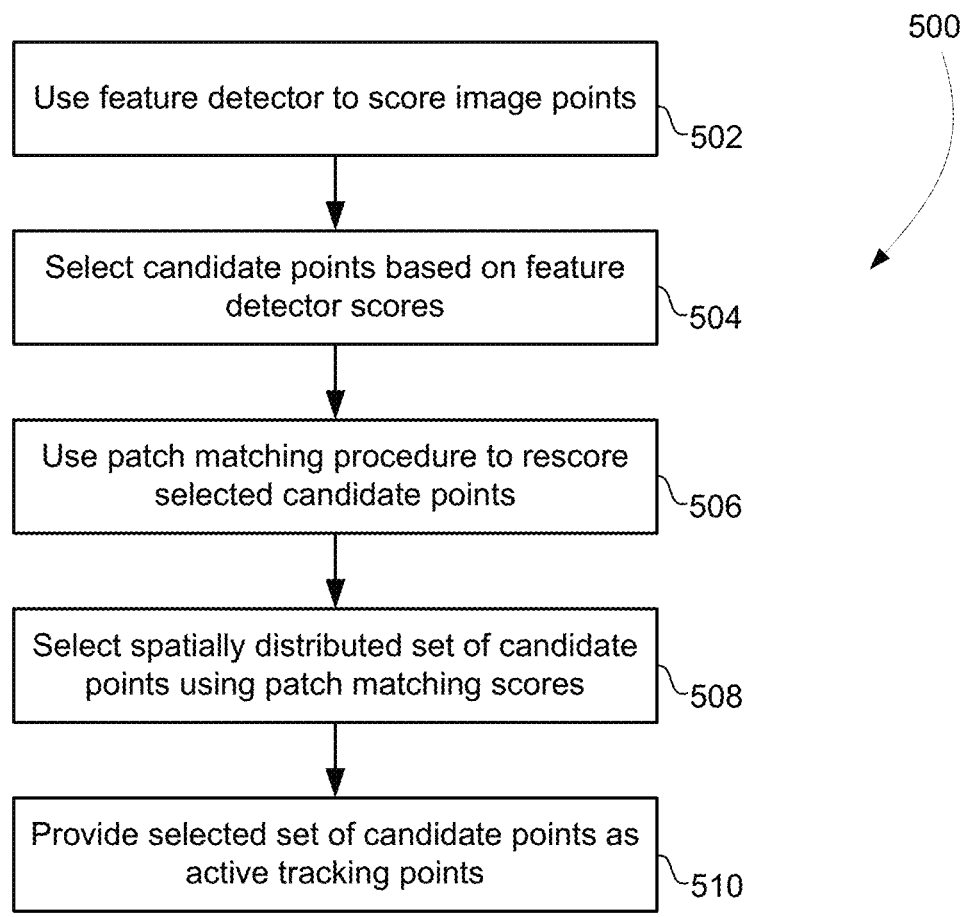
FIG. 5 illustrates example steps of a process for selecting points to track in accordance with at least one embodiment.

As noted above, it is often desirable to effectively select points to be tracked from a frame of a video. For example, if points are not selected effectively, it may be difficult to track the selected points, thereby potentially causing inaccuracies in a point tracking process. Accordingly, FIG. 5 shows an illustrative example of the process 500 for selecting points to track. Selecting points to track may occur at any suitable time, such as initially when a tracking process begins or at other times. In an embodiment, the process 500 includes using a feature detector to score 502 image points of an image frame. In an embodiment, the feature detector is a corner detector. A corner detector may be a process that incorporates one or more corner detection algorithms. More generally, a feature detector may be a process that incorporates one or more feature detection algorithms. Suitable corner and other feature detection algorithms include, but are not limited to Moravec corner detection algorithms, Harris and Stephens detection algorithms, Plessey detection algorithms, Shi-Tomasi detection algorithms, multi-scale Harris operator detection algorithms, level curve curvature detection algorithms, LoG (Laplacian of Gaussian) detection algorithms, DoG (Difference of Gaussian) detection algorithms, DoH (determinant of the Hessian) detection algorithms, affine-adapted interest point operator-based detection algorithms, Wang and Brady detection algorithms, SUSAN (smallest univalue segment assimilating nucleus) corner detection algorithms, Trajkovic and Hedley corner detection algorithms, and AST (accelerated segment test) or FAST (features from accelerated segment test) based feature detection algorithms.

Once the image points have been scored, a set of candidate points are selected 504 based at least in part on the feature detector scores. For example, a corner detector, such as a Harris or FAST corner detector, may employ a function that provides a score that indicates an extent to which points resemble a corner. A set of points having the highest scores may be selected as candidate points. In an embodiment, once the candidate points have been selected, a patch matching procedure is used 506 to rescore the selected candidate points. In an embodiment, using the patch matching procedure to rescore the selected candidate points includes comparing a patch surrounding each candidate point with patches surrounding the candidate points. The candidate points are then rescored based at least in part on how closely the patches surrounding the candidate points match the surrounding patches. In an embodiment, a match between two patches is scored such that, the more the patches resemble one another, the higher the score. The score used to rescore a candidate point may be equal to or at least based in part on the inverse of the highest score between a patch surrounding the candidate point and patches surrounding the candidate point. It should be noted that the matching score between the patch surrounding the candidate point and itself may be ignored (or not computed) since a patch may always resemble itself. In this manner, points that resemble surrounding points are scored lower than points that do not resemble surrounding points.

A visual representation of using the patch matching procedure in accordance with at least one embodiment is described below in connection with FIG. 6. Returning to the process 500 of FIG. 5 in an embodiment, a specially distributed set of candidate points is selected 508 using the patch matching scores. In an embodiment, the set of candidate points is selected so that the points are distributed throughout various locations of a frame so as to avoid (but not necessarily prevent) selecting clusters of candidate points, that is, a set of candidate points that are geometrically close to one another. A visual representation of a procedure for selecting the candidate points using the patch matching scores is described below in connection with FIG. 7. In an embodiment, once the spatially distributed set of candidate points is selected 508, the selected set of candidate points is provided 510 as a set of active tracking points for use in tracking procedure. Information identifying the selected points, for example, may be stored in memory of a device performing the process 500 or generally any device performing any process involving the tracking of points.

Figure 6:
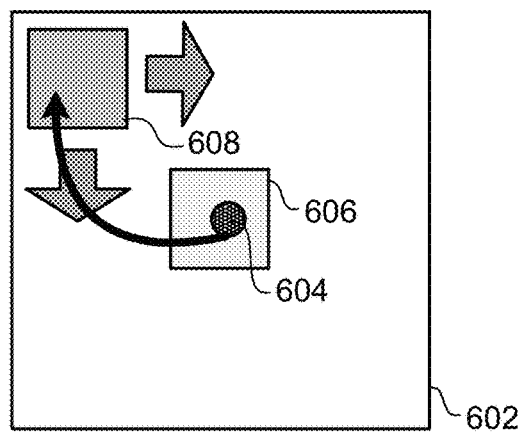
FIG. 6 shows a visual representation of a step of the process shown in FIG. 5.
Figure 7:
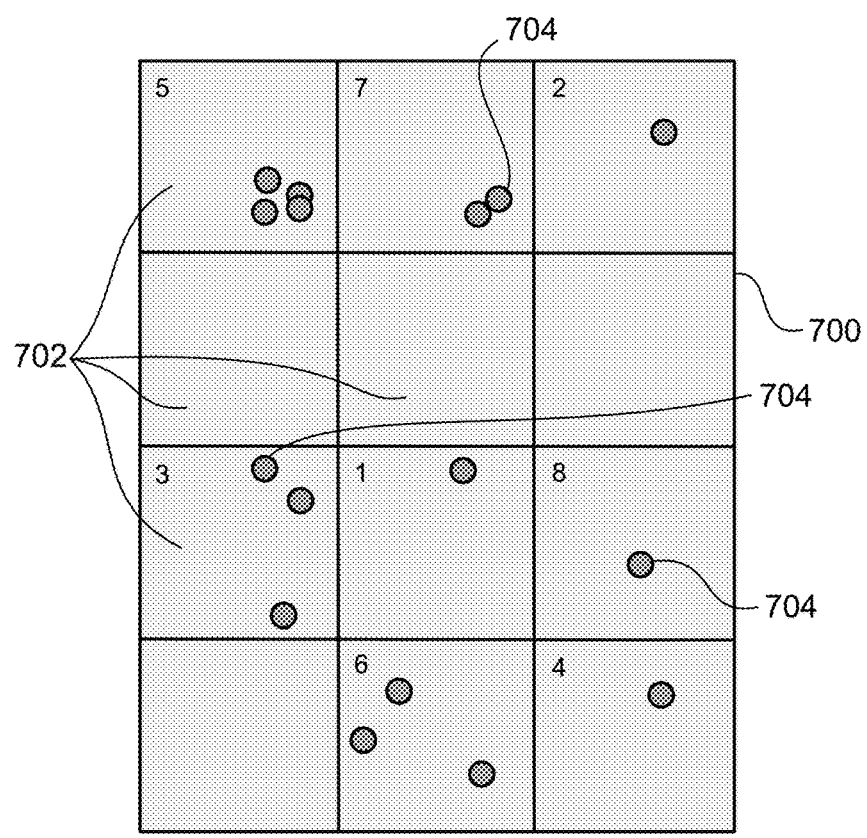
FIG. 7 shows a visual representation of a step of the process shown in FIG. 5.

As discussed, FIG. 6 illustrates an example for scoring candidate points by using a patch matching procedure. On this particular example, a search window 602 surrounds a candidate point 604. A patch 606 surrounding the candidate points 604 is compared with other patches 608 of the search window 602. As illustrated, the patches 608 may be compared with the patch 606 surrounding the candidate point 604 sequentially, by comparing each patch in a plurality of rows of patches, starting from a top left corner of the search window 602. Of course, patches may be compared in any sequence and, if such processing is available, multiple patches may be compared simultaneously. Each comparison between a patch 608 of the search window 602 and the patch 606 of the candidate point 604, in an embodiment, results in a score that is based at least in part on how well the patches match each other. As noted above, in an embodiment, the score is configured such that higher scores indicate stronger resemblance between patches. The candidate point 604 may be rescored based at least in part on the inverse of the best patch matching score. In this manner, the score may be used to avoid selecting points that may be easily confused with other points that are geographically proximate to the candidate point.

As discussed above, FIG. 7 provides a visual representation of a process for selecting a spatially distributed set of points to track. In an embodiment, an image frame 700 is divided into a plurality of bins 702. In this particular example, the image frame 700 is a rectangular region divided into three bins across by four bins down, resulting in twelve total bins. In an embodiment, as indicated by the numbers labeling several of the bins, bins 702 containing candidate points 704 are visited in a random order and one or more candidate points are selected from each visited bin. Visiting a bin may include comparing scores of the candidate points of the bin and selecting one or more of the candidate points based at least in part on the scores. New bins may be visited until a sufficient number of candidate points are selected, which may be a predetermined number of candidate points. It should be noted that while the bins may be visited in a random order, candidate points may be selected from the bins in any manner that insures spatial distribution of the set of points eventually selected. For example, bins may be visited in a predetermined order that is calculated to achieve a spatially distributed set of selected points. Similarly, an algorithm may be employed that selects bins to visit in a manner that is calculated to achieve a spatially distributed set of selected points. An algorithm may, for example, select a bin and select one or more points from the bin. The next bin visited may be a farthest bin from one or more bins already visited. Generally, any manner of selecting points that is calculated to achieve a spatial distributed selection of points may be utilized.

Figure 8:
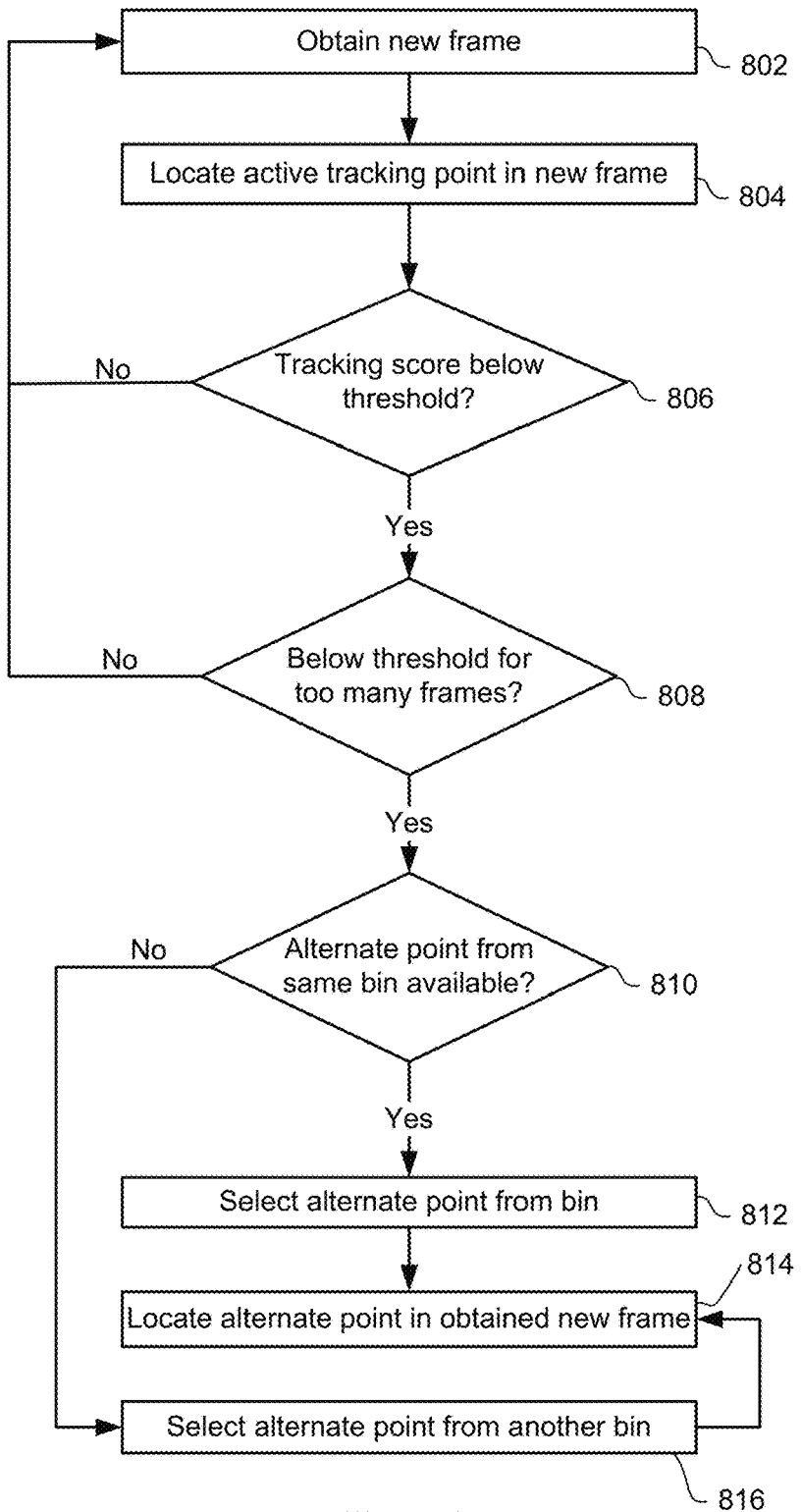
FIG. 8 illustrates example steps of a process for tracking points in accordance with at least one embodiment.

In an embodiment, once points are selected, the selected points may be tracked. FIG. 8 shows an illustrative example of a process 800 which may be used to track points in accordance with at least one embodiment. The process 800 shown in FIG. 8 may be used in connection with other processes described herein, such as the process 300 described above in connection with FIG. 3, and variations thereof. In an embodiment, the process 800 of FIG. 8 includes obtaining 802 a new frame and locating an active tracking point in the new frame. The active tracking point may be a point selected or otherwise obtained from a previous frame.

In an embodiment, a determination is made 806 whether the located active tracking point has a tracking score below a threshold. The tracking score may be a score based at least in part on a patch matching score between a patch containing active tracking point in the obtained new frame and a patch containing a corresponding point in a previous frame. Generally, the tracking score may be any score suitable to determine how well the located point matches a previous point. The tracking score for a point being below the threshold may indicate that the point is no longer a good point to track. At the same time, whatever caused the point to become unfit for tracking may be temporary due to some fleeting obstruction, light effects, or other reason. Accordingly, in an embodiment, a point being tracked across frames is allowed to have a tracking score below the threshold for some time. Accordingly, in an embodiment, if the tracking score is below the threshold, a determination is made 808 whether the tracking score has been below the threshold for too many frames. The number of frames for which the tracking score may be below the threshold may be any suitable number and the number may be based at least in part on various characteristics of the video, such as the frame rate of the video.

If the tracking score has not been below the threshold for too many frames, the located tracking point is continued to be used as a tracking and new frame is obtained 802 and the process begins anew. While not illustrated as such, locating an active tracking point in a new frame, determining whether the tracking score is below the threshold, and determining whether the tracking score was below the threshold for too many frames, and other actions may be performed for multiple points before a new frame is obtained. As noted, however, the tracking score being below the threshold for too many frames may indicate low confidence in the located point. Accordingly, if it is determined 808 that the tracking score for the point has been below the threshold for too many frames, in an embodiment, a determination is made 810 whether an alternate point from the same bin is still available. The bin may be, for examples, bins used in accordance with the process described above in connection with FIG. 7 or may be any area in the vicinity of an expected location of the tracking point. In an embodiment, if an alternate point from the same bin is available, then an alternate point is selected 812 from that bin and an alternate point in the obtained new frame that matches the selected alternate point is located 814. Locating the alternate point may be performed using the various techniques described herein, such as patch matching techniques described above.

If, however, an alternate point from the same bin is not available, then in an embodiment, an alternate point is selected 816 from another bin. The other bin may be, for example, a bin that is proximate to the bin that was previously used. The selected alternate point from another bin may be matched with a point in the obtained new frame to locate the selected alternate in the obtained new frame. As with locating an active tracking point in a new frame, determining whether the tracking score is below the threshold, and determining whether the tracking score was below the threshold for too many frames, determining whether an alternate point from the same bin is available and related and other actions may be performed for multiple points.

Figure 9:
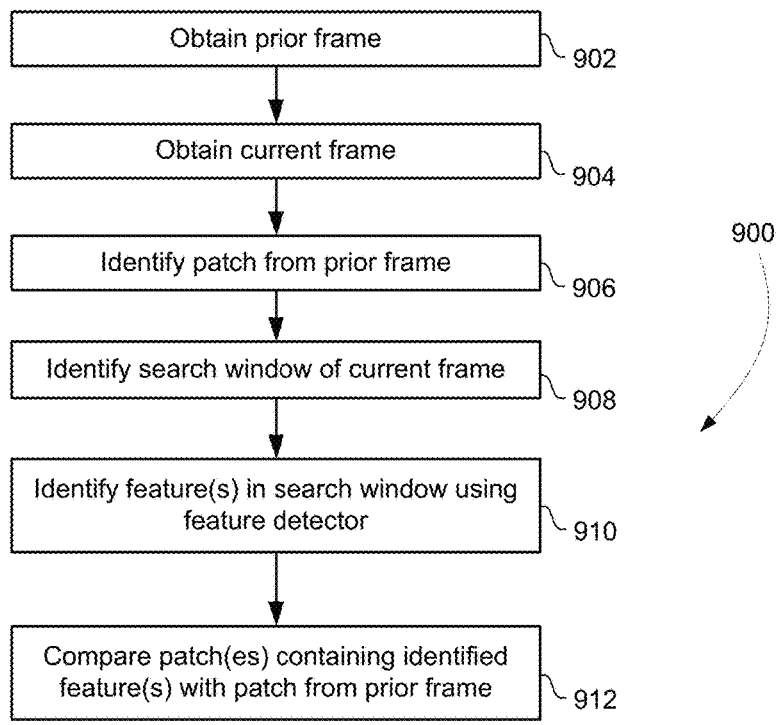
FIG. 9 illustrates example steps of a process for matching patches of one frame to another frame in accordance with at least one embodiment.

As noted, various processes described herein may involve the use of matching patches between one frame and another. Depending on the patch size, frames may have numerous patches and matching patches from one frame to another may involve numerous comparisons, most of which may not yield a match. FIG. 9, accordingly, shows an illustrative example of a process 900 for patch matching between frames with improved efficiency. In an embodiment, a prior frame is obtained 902 and a subsequent frame 904 is also obtained. In an embodiment, a patch from the prior frame is identified 906. The patch may be, for example, a patch surrounding a point being tracked but may be any patch of interest for which identification of a match is desired. In an embodiment, a search window of the subsequent frame is identified 908.

The search window, for example, may be a window surrounding the same location of the identified patch. The search window may be identified in other ways, such as described below in connection with FIGS. 10, 11 and 12, for example, by using various data to estimate a location of a matching patch or, more generally, a location of a region where a matching patch is likely to be found. In an embodiment, a feature detector is used to identify 910 one or more features in the search window. In an embodiment, the feature detector is a corner detector, such as described above. Therefore, in this embodiment, one or more corners in the search window may be identified. In an embodiment, once the features in the search window are identified, patches containing the identified features are compared 912 with the patch from the prior frame. Patch comparison may be performed in any suitable manner, such as in a manner described above. Thus, the identified patch is compared with patches of the subsequent frame for which a particular feature has been detected. In this manner, patches that are more likely to match due to the feature detection are compared before less likely potential matching patches, if any, are compared with the identified patch from the prior frame. Therefore, greater efficiency is achieved as more likely candidates for matching are given higher priority. An illustrative example of how aspects of the process 900 may be used is shown below in connection with FIG. 12.

Figure 10:
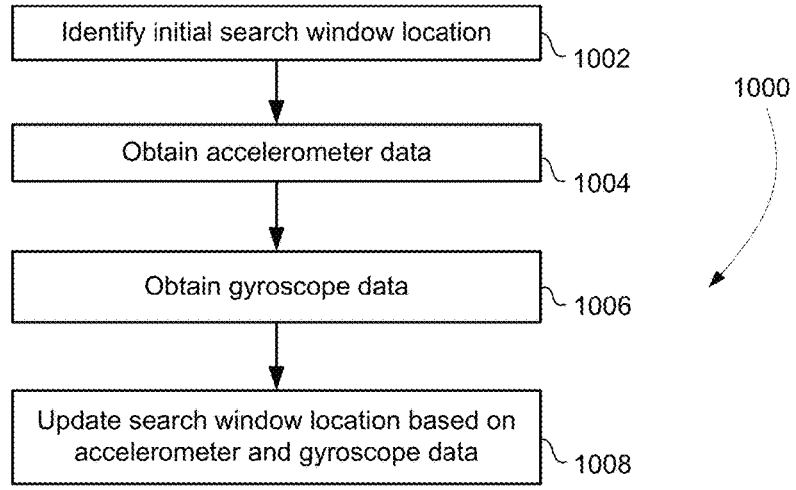
FIG. 10 illustrates example steps of a process for determining where to begin searching for a matching in accordance with at least one embodiment.

As discussed, image-capture devices often include various detectors that detect motion of the device. Many mobile devices, for example, include gyroscopes and accelerometers which provide information indicating how the devices are being moved. Information provided by one or more such detectors, in various embodiments, is used to improve various processes described herein and variations thereof. FIG. 10, as an example, shows an illustrative example of a process 1000 for updating a search window location based on accelerometer and gyroscope data. It should be noted that, while for the purpose of illustration accelerometer data and gyroscope data is used in the process 1000, the process 1000 may be adapted to use any type of data that indicates one or more aspects of device movement. As an example, a device may include one or more controls that may modify various aspects of a capture device of the device. The controls may modify, for instance, zoom and direction of capture. Data regarding how the capture device is being controlled may be used in an adaptation of the process 1000 or, generally, in any process described and suggested herein that utilizes information regarding changes with respect to how a device captures video.

Returning to FIG. 10, in an embodiment, an initial search window location is identified 1002. For example, the initial search window location may be identified such that the initial search window surrounds a point being tracked. The initial search window location may be, for example, the location of the point being tracked. In an embodiment, the process 1000 includes obtaining 1004 accelerometer data from an accelerometer and obtaining 1006 gyroscope data from a gyroscope. While obtaining 1004 accelerometer data and obtaining 1006 gyroscope data is illustrated in FIG. 10 sequentially, such actions may be performed in parallel or in a different sequence than illustrated.

In an embodiment, the search window location is updated based on the accelerometer and gyroscope data. Generally, the window location is updated based at least in part on an estimate of a direction and amount of translation a point has moved from one point to another. The estimate may be based at least in part on the accelerometer and gyroscope data. For example, the gyroscope data indicates that the camera of the mobile device has rotated, the search window may be translated according to the amount of rotation indicated by the gyroscope data according to the direction of rotation. The direction of translation may correspond to a direction of rotation indicated by the gyroscope data. Generally, the amount an object in a video may translate between frames of an image may depend on the distance of the object from the device capturing the video of the object. Because the amount of translation of an object in a video from one frame to the other may depend on the distance of the object to the device capturing the video, the amount of translation may assume a predetermined object distance. In this manner, the amount of translation may be based on a linear relationship with the amount of rotation. If a device includes a proximity sensor or other mechanism for judging distance to an object, the distance of the object may be taken into account when determining the amount of translation of the search window from one frame to the other.

Similarly, if the accelerometer data indicates that the capture device has moved, the search window location may be updated depending on the direction and magnitude of the movement indicated by the accelerometer data. For example, if the movement is parallel to the direction at which the capture device is capturing images, the search window location may be left unchanged. Similarly, if the motion is perpendicular to the direction at which the image is being taken, the search window may be translated accordingly. The amount a capture device translates laterally may have a linear relationship with an amount a search window is translated when updated. As noted, the gyroscope data and accelerometer data (and/or any other data regarding changes in how a capture device captures video) may be taken into account together when updating the search window location. For instance, if the gyroscope data and accelerometer data indicates that a capture device was rotated and translated, the search window may be updated based at least in part on both the rotation and translation indicated by the gyroscope data and accelerometer data.

Figure 11:
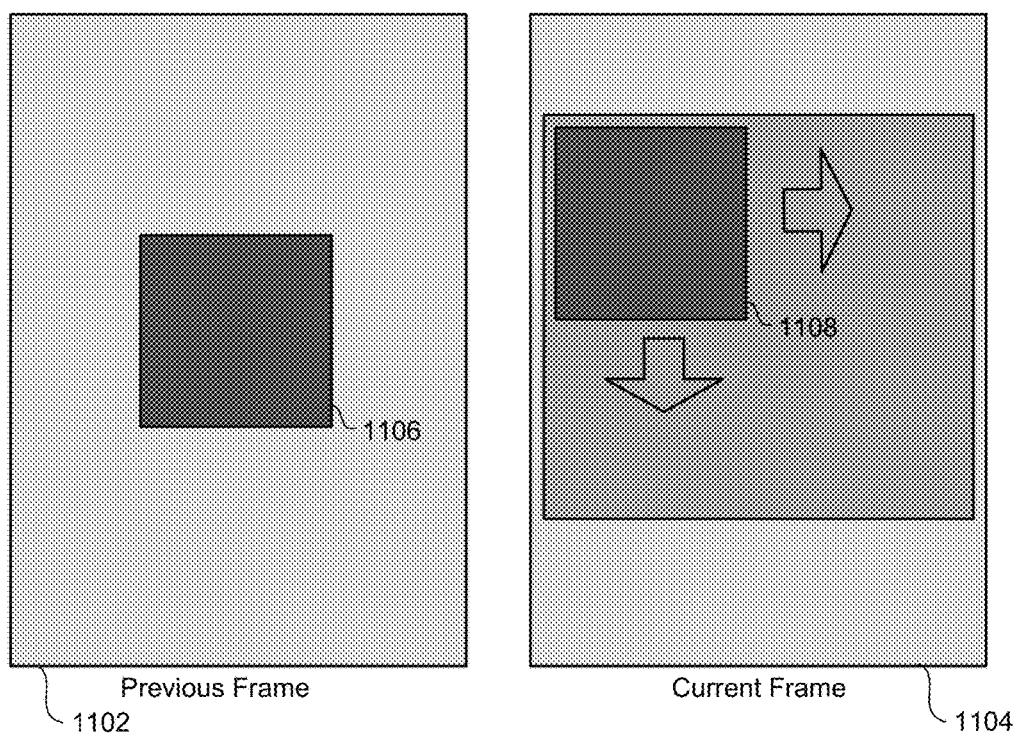
FIG. 11 provides a visual representation of a manner in which the process of FIG. 10 may be performed in accordance with at least one embodiment.

In some instances, image data itself may be used to estimate how points have moved from one frame to another. As noted, such estimates may be used to update search window locations and otherwise improve the efficiency of object tracking. FIG. 11 shows another example of how a search window location may be updated which may be used as an alternative or in addition to methods that utilize gyroscope and/or accelerometer data. In this case, a search window location is updated based on image data of frames that have been obtained. As illustrated, FIG. 11 shows a previous frame 1102 and a current frame 1104. In an embodiment, a low resolution representation of the previous frame 1102 and the current frame 1104 are obtained, such as by downsampling the frames.

A patch matching procedure, such as above, is used to compare a low-resolution region 1106 of the previous frame with similarly-sized regions of a current frame as indicated in the figure. The regions of the current frame may be from an area surrounding a center of the downsampled region of the previous frame. Patches of the region may be compared systematically, as indicated by the arrows of FIG. 11, or otherwise, such as in a random order. Once a match is found, the difference in locations between the frames provides an estimate of how far one or more objects have moved between frames. For example, if patch 1108 of the previous frame 1102 is located at one location is found to match a patch of the current frame 1104 located at another location, the difference in the two locations may indicate a distance and direction an object has moved between the previous frame 1102 and current frame 1104. This estimate may be used, for example, to update a search window location. The estimate may also be compared with other estimates, such as estimates obtained by using gyroscope and/or accelerometer data, as described above.

Figure 12:
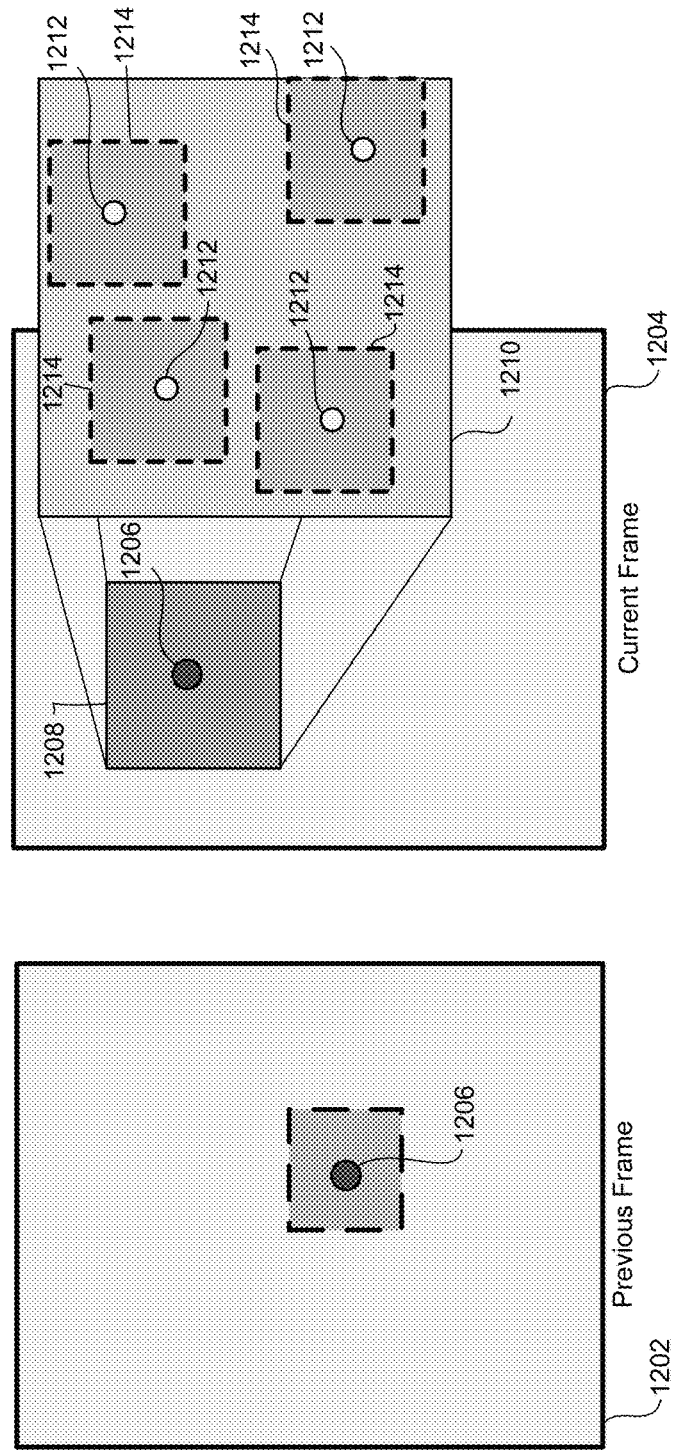
FIG. 12 illustrates a process for matching patches in accordance with at least one embodiment.

FIG. 12 provides an illustrative example of a portion of the process 900 shown in FIG. 9 and in particular the use of features in a patch-matching technique. As shown in FIG. 12, a previous frame 1202 and a current frame 1204 are included. A point 1206 of the previous frame in this example is being tracked. A patch 1208 surrounding the point 1206 of the previous frame is compared with other patches of the current frame. However, patches of the current frame are selected for comparison in a manner that makes it more likely that a match will be found quickly.

In an embodiment, a location corresponding to the point 1206 is used as a center of a search window 1208 which is shown in expanded form as search window 1210 in FIG. 12. The search window may have a different location, such as a location that has been updated in accordance with the above description. The search window 1210 is analyzed to identify features 1212. A feature detector, such as described above, may be utilized to identify the features. In an embodiment, the features are corners. Once the features are identified, corresponding patches 1214 that surround the features are compared to the patch 1208 of the previous frame. In this manner, not all patches of a search window 1210 need to be checked, thereby improving efficiency. For example, four patches of the search window 1210 are needed in the illustrative example of FIG. 12. Checking every patch in the illustrated window 1210 would result in more comparisons. For example, the dimensions of the search window 1210 are three times the dimensions of the patches being compared, resulting in nine total patches, not counting overlapping patches. Depending on the size of the patches being compared, utilizing the technique illustrated in FIG. 12 may result in even greater efficiency gains.

Figure 13:
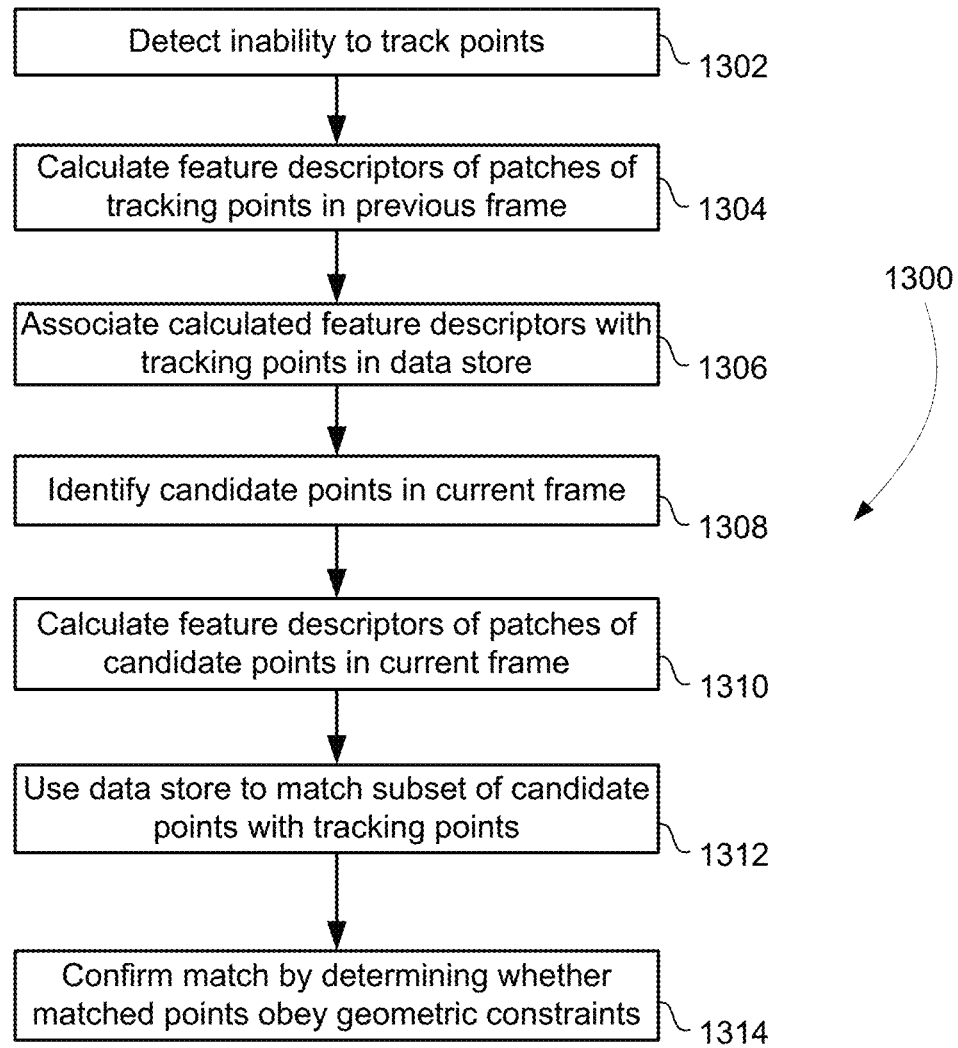
FIG. 13 illustrates example steps of a process for recovering an inability to track at least one point in accordance with at least one embodiment.

While capturing video and tracking points in the video, it is possible that points being tracked may be lost for various reasons. A capture device, for example, may be moved significantly making a new corresponding point appear in a different way. Objects may also be rotated or obscured, such that the objects appear in one frame but not the other. Reflections and other light effects may cause the image to change significantly. FIG. 13, accordingly, shows an illustrative example of a process 1300 for track recovery when track is lost. As with all the processes described herein, the process 1300 may be combined with one or more other processes.

In an embodiment, the process 1300 includes detecting an inability to track points 1302. For example, according to the process described above in connection with FIG. 8, a tracking score of a tracked point may be too low or too long of a time (such as for too many frames). Similarly, a point matching a point being tracked may simply not be found. In an embodiment, feature descriptors of patches surrounding tracking points in a previous frame are calculated 1304 and associated 1306 with the tracking points in a data store, such as memory of a device that is performing the process 1300. The feature descriptors may be invariant feature descriptors, such as a scale-invariant feature transform SIFT feature descriptor, a speeded up robust features (SURF) feature descriptor, or a feature descriptor described in U.S. application Ser. No. 12/319,992 entitled "System and Method for Representing Image Patches" filed on Jan. 14, 2009. In an embodiment, the calculated feature descriptor is a vector or other collection of information that, based on analysis of a patch, describes one or more invariant features of the patch. The features may be invariant to one or more changes in an image, such as scale, orientation, affine distortion, and/or changes in illumination.

In an embodiment, candidate points are identified 1308 in the current frame. In an embodiment, the candidates are identified by utilizing the feature detector that was used to initially identify the points that were tracked. For instance, if the tracking points for which track was lost were identified using a corner detector, a corner detector may be used to identify candidate points having corner-like properties in the current frame. A feature detector may be used based at least in part on one or more properties of the tracking points for which track was lost and, generally, any feature detector or method of identifying candidate points may be used.

In an embodiment, feature descriptors of patches surrounding the candidate points are calculated 1310 and used to identify 1312 matches from the data store. A match between a candidate point and a tracking point of a previous frame may be made, for example, by identifying a feature descriptor for the tracking point that most closely matches the feature descriptor for the candidate point. Similarly, a match between a candidate point and a tracking point of a previous frame may be made by identifying a feature descriptor for the candidate point that most closely matches the feature descriptor for the tracking point. Generally, any method of matching points based on feature descriptors calculated for the points may be used. In an embodiment, the calculated feature descriptor for a candidate point and calculated feature descriptor for a tracking must be sufficiently close to one another (such as within a predetermined radius of one another) before the tracking point and candidate point are matched. In this manner, candidate points and tracking points are not matched with one another unless their feature descriptors are sufficiently similar to one another, regardless if there are no better possible matches. In addition, it should be noted that not all points may be matched. For instance, one or more points in the current frame may be obstructed and, therefore, would not be identified as candidate points.

Once points of a previous frame are matched with points of the current frame, in an embodiment, the matches are confirmed by determining whether the matched points obey one or more geometric constraints. A random sample consensus (RANSAC) algorithm may be used to determine whether the matched points obey the one or more geometric constraints. For instance, RANSAC may be used to determine whether the matched points are arranged in a manner that is consistent with a translation, rotation, and/or enlargement of an object to which the points correspond (such as book or other object that is the subject of a video). It should be noted that subsets of the matched points may be checked to determine whether the subsets obey one or more geometric constraints, such as when all of the matched points are determined not to obey the one or more geometric constraints.

Figure 14:
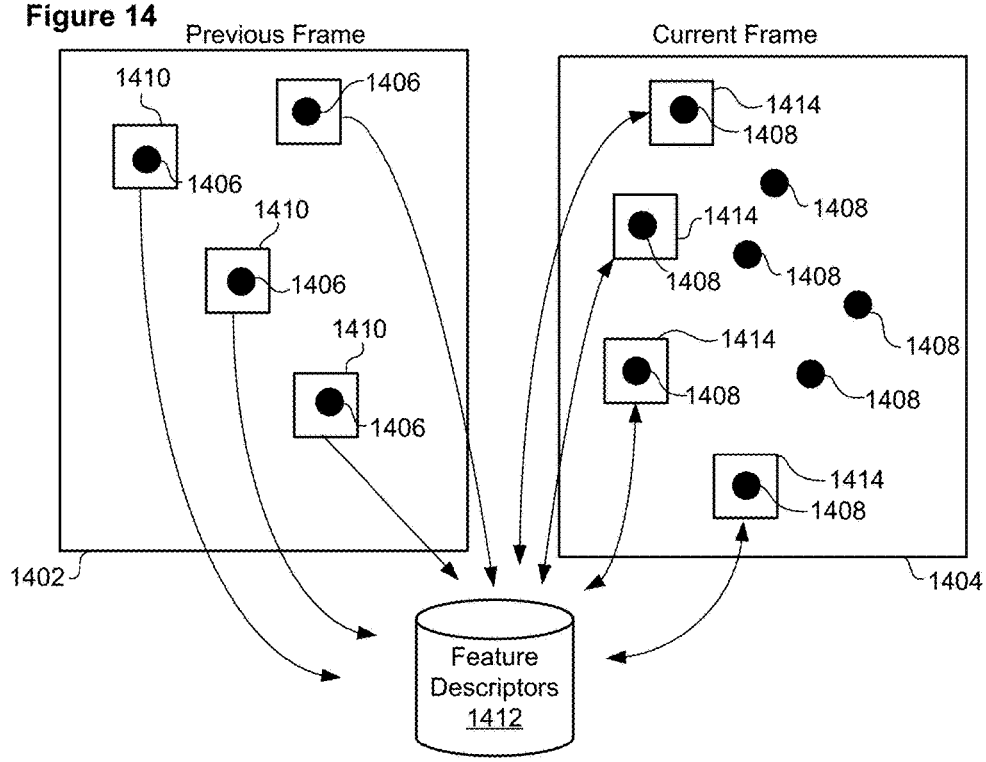
FIG. 14 shows an illustrative example of a step of the process of FIG. 13.

As noted, FIG. 14 shows an illustrative example of how tracking may be regained, such as in connection with the process 1300 described above in connection with FIG. 13. For example, in FIG. 14, a previous frame 1402 and a current frame 1404 are illustrated. Points 1406 of the previous frame in this example are being tracked. Upon detection of an inability to track the points 1406 of the previous frame, a set of candidate points 1408 in the current frame may be determined. Candidate points 1408, for example, may be identified using a corner detector as having corner-like properties.

Further, feature descriptors of patches 1410 of the previous frame 1402 may be calculated and stored in a data store 1412. Feature descriptors may be calculated for patches 1414 surrounding at least some of the candidate points 1408. The calculated feature descriptors of the patches of the candidate points 1408 may be compared with feature descriptors of the patches 1410 surrounding the tracking points 1406 stored in the data store 1412 to identify one or more matches among the candidate points and tracking points.

FIG. 9 illustrates a set of basic components of a video capturing device 1500 which may be used in accordance with various embodiments. In this example, the device includes at least one processor 1502 for executing instructions that can be stored in a memory device or element 1504. The instructions may include instructions related to one or more of the processes described herein, and/or combinations and/or variations thereof. The device can include many types of memory, data storage or computer-readable media, such as a first data storage for program instructions for execution by the processor 1502, the same or separate storage that can be used for images or data, a removable memory that can be available for sharing information with other devices, and any number of communication approaches that can be available for sharing with other devices. The device may include at least one type of display element 1506, such as a touch screen, light emitting diode (LED) or liquid crystal display (LCD). Additional information may convey information via other mechanisms, such as through audio speakers.

As discussed, the device in some embodiments may include at least two image capture elements 1508, such as at least one image capture element positioned to determine a relative position of a viewer and at least one image capture element operable to image a user, people, or other viewable objects in the vicinity of the device. An image capture element can include any appropriate technology, such as a CCD image capture element having a sufficient resolution, focal range and viewable area, to capture images, such as sequences of images of a video. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include at least one orientation determining element 1510, such as an accelerometer, digital compass, electronic gyroscope, or inertial sensor, which can assist in determining movement or other changes in orientation of the device. The device can include at least one additional input device 1512 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 15:
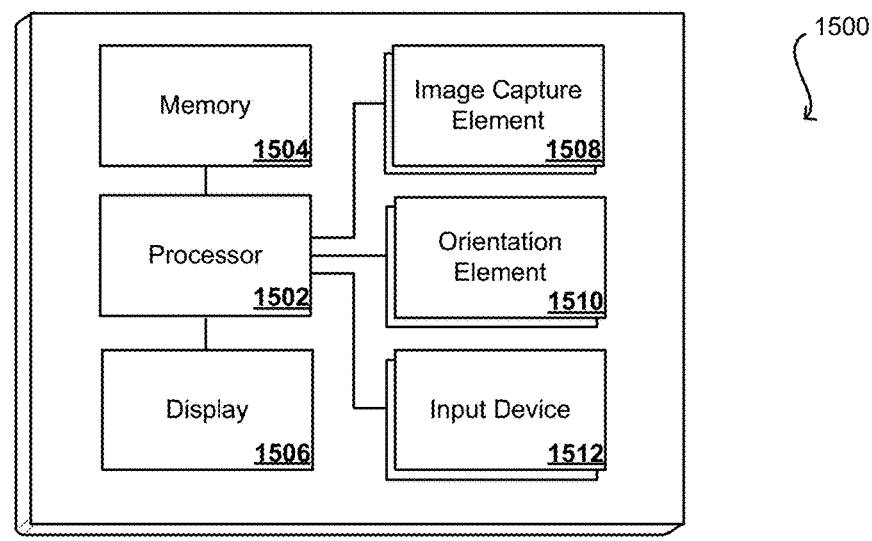
FIG. 15 illustrates components of a device that may be used in accordance with at least one embodiment.

The device described in connection with FIG. 15 may include more or fewer components than illustrated. For example, the device may include one or more elements for communicating information between the devices and other devices. The device may, for example, be a mobile telephone that is operable to communicate information using one or more communications networks, such as the Internet, mobile communication networks such as WiMAX networks, cellular networks, and, generally, any network over which information may be communicated. The device may utilize one or more communications networks to communicate information about objects tracked in accordance with the various embodiments described herein. The device may, for instance, communicate information about an object being tracked in a video to a service that operates to recognize the object and provide, to the device, information about the object. The service may, for example, recognize the object, locate information about the object in a data store, and provide at least some of the located information for display on the display element of the device. The information may include information related to consumption (such as purchase) of the object, such as the price of the object in an electronic marketplace. One or more hyperlinks may be provided by the service to enable the user to purchase or otherwise consumer the device.

Figure 16:
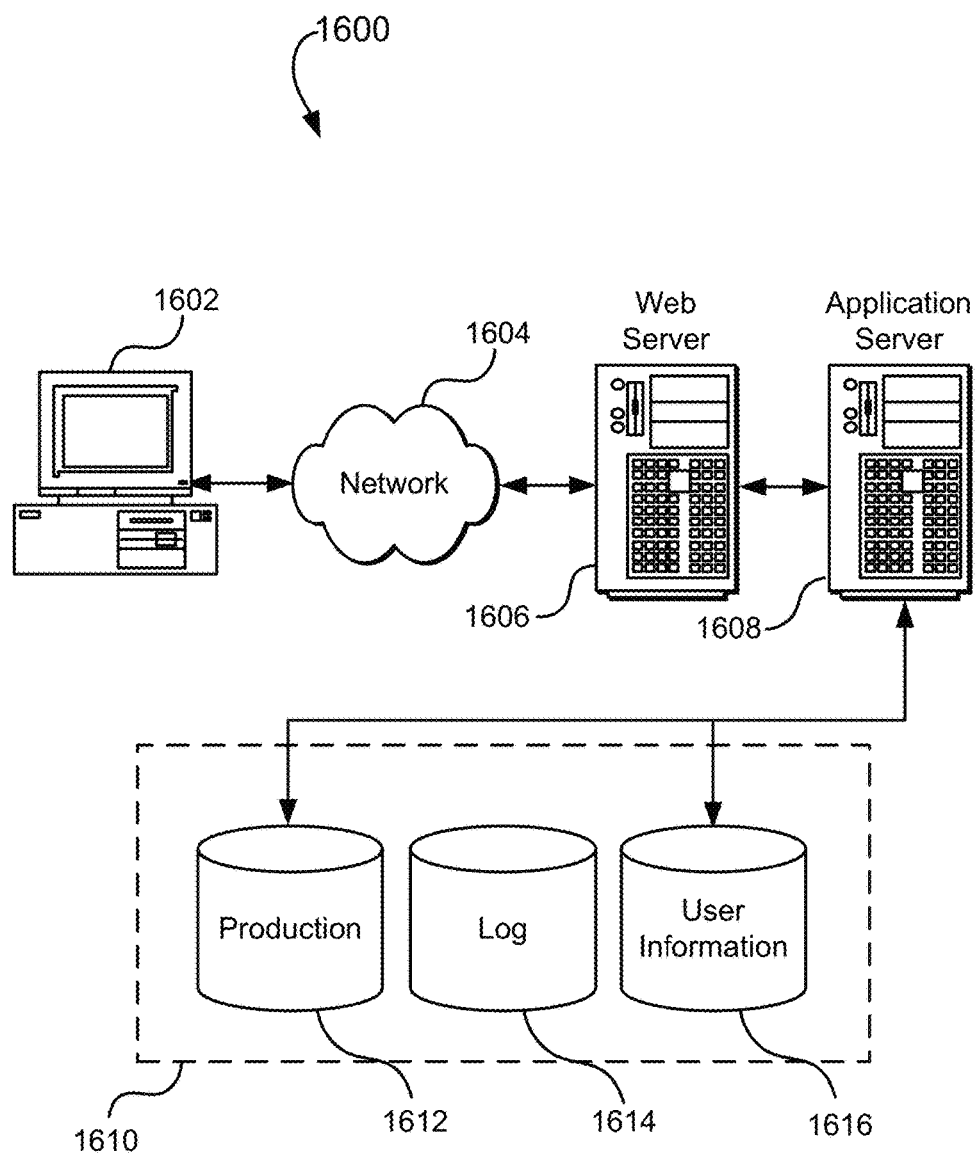
FIG. 16 illustrates an environment in which various embodiments may be practiced.

FIG. 16 illustrates an example of an environment 1600 for implementing aspects in accordance with various embodiments. As will be appreciated, although a Web-based environment is used for purposes of explanation, different environments may be used, as appropriate, to implement various embodiments. The environment includes an electronic client device 1602, which can include any appropriate device operable to send and receive requests, messages, or information over an appropriate network 1604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1602 and the application server 1608, can be handled by the Web server. It should be understood that the Web and application servers are not required and are merely example components, as structured code discussed herein can be executed on any appropriate device or host machine as discussed elsewhere herein.

The data store 1610 can include several separate data tables, databases, or other data storage mechanisms and media for storing data relating to a particular aspect. For example, the data store illustrated includes mechanisms for storing production data 1612 and user information 1616, which can be used to serve content for the production side. The data store also is shown to include a mechanism for storing log data 1614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1610. The data store 1610 is operable, through logic associated therewith, to receive instructions from the application server 1608 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1602. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computing device comprising:
   a camera;
   one or more processors;
   a memory device including instructions that, when executed by the one or more processors, cause the computing device to:
      receive first image data captured using the camera;
      select a first tracking point within an area of the first image data;
      compare a first patch of pixels surrounding the first tracking point within the area with a second patch of pixels within the area to determine a similarity score;
      determine a distinctiveness of the first tracking point based at least in part the similarity score;
      receive second image data captured using the camera; and
      determine a second tracking point in the second image data corresponding to the first tracking point.

2. The computing device of claim 1, wherein the instructions, when executed, further cause the computing device to:
   determine respective measures of similarity between the first patch of pixels and a plurality of other patches of pixels within the area; and
   determine the distinctiveness of the first tracking point based at least in part on the measures of similarity.

3. The computing device of claim 1, wherein the instructions, when executed, further cause the computing device to:
   compare the first patch with a plurality of patches of the second image data within a search window.

4. The computing device of claim 3, wherein the instructions, when executed, further cause the computing device to:
   determine a matching patch in the plurality of patches based at least in part on a measure of similarity between the first patch and the matching patch.

5. The computing device of claim 3, wherein the area is the same size as the search window.

6. The computing device of claim 3, further comprising:
   a motion-based sensor providing data, the data used to estimate a location of the search window in the second image data.

7. The computing device of claim 1, wherein the instructions, when executed, further cause the computing device to:
   compare the first patch with patches of the second image data within a search window until a matching patch is determined, the first patch and the matching patch having a measure of similarity meeting or exceeding a threshold.

8. The computing device of claim 1, wherein the first tracking point is associated with a representation of an object in the first image data, and wherein the instructions, when executed, further cause the computing device to:
   detect an absence of points in the second image data corresponding to the first tracking point; and
   indicate that at least a portion of the representation of the object is not in the second image data.

9. A computer-implemented method, comprising:
   receiving image data;
   determining a plurality of candidate points based on the image data;
   determining respective distinctiveness for the plurality of candidate points by comparing a patch of pixels surrounding a candidate point with other patches of pixels within a window containing the candidate point;
   determining a spatial distribution of the plurality of candidate points;
   selecting a tracking point from the plurality of candidate points based at least in part on the respective distinctiveness scores and the spatial distribution; and
   identifying points corresponding to the tracking point in a plurality of frames of the image data.

10. The computer-implemented method of claim 9, further comprising:
    comparing a patch of pixels surrounding the tracking point with an array patches within a search window of a subsequent frame of the plurality of frames; and
    determine a matching patch in the array of patches based at least in part on a measure of similarity between the patch of pixels surrounding the tracking point and the matching patch.

11. The computer-implemented method of claim 10, wherein the window containing the tracking point is the same size as the search window.

12. The computer-implemented method of claim 9, further comprising:
    comparing a patch of pixels surrounding the tracking point in a first frame of the plurality of frames to a patch of pixels surrounding a corresponding point in a second frame of the plurality of frames, wherein the second frame is subsequent to the first frame in a sequence; and
    determining a tracking score based on the comparison.

13. The computer-implemented method of claim 12, further comprising:
    determining that the tracking score is below a threshold; and
    selecting a new tracking point.

14. The computer-implemented method of claim 13, further comprising:
selecting the new tracking point based on the distinctiveness and a spatial position of the new tracking point.

15. A non-transitory computer readable storage medium storing instructions, the instructions when executed by a processor causing the processor to:
receive image data;
determine a plurality of candidate points based on the image data;
determine respective distinctiveness scores for the plurality of candidate points by comparing a patch of pixels surrounding a candidate point with other patches of pixels within a window containing the candidate point;
determine a spatial distribution of the plurality of candidate points;
select a tracking point from the plurality of candidate points based at least in part on the respective distinctiveness scores and the spatial distribution; and
identify points corresponding to the tracking point in a plurality of frames of the image data.

16. The non-transitory computer readable storage medium of claim 15, the instructions when executed by a processor further causing the processor to:
compare a patch of pixels surrounding the tracking point with an array patches within a search window of a subsequent frame of the plurality of frames; and
determine a matching patch in the array of patches based at least in part on a measure of similarity between the patch of pixels surrounding the tracking point and the matching patch.

17. The non-transitory computer-readable storage medium of claim 16, wherein the window containing the tracking point is the same size as the search window.

18. The non-transitory computer readable storage medium of claim 15, the instructions when executed by a processor further causing the processor to:
compare a patch of pixels surrounding the tracking point in a first frame of the plurality of frames to a patch of pixels surrounding a corresponding point in a second frame of the plurality of frames, wherein the second frame is subsequent to the first frame in a sequence; and
determine a tracking score based on the comparison.

19. The non-transitory computer-readable storage medium of claim 18, the instructions when executed by a processor further causing the processor to:
determine that the tracking score is below a threshold; and
select a new tracking point.

20. The non-transitory computer-readable storage medium of claim 19, the instructions when executed by a processor further causing the processor to:
select the new tracking point based on the distinctiveness and a spatial position of the new tracking point.

* * * * *